US012671332B2

(12) United States Patent
Ke et al.

(10) Patent No.: US 12,671,332 B2
(45) Date of Patent: Jun. 30, 2026

(54) POWER STAGE CIRCUIT AND VIRTUAL CURRENT SIGNAL GENERATION METHOD

(71) Applicant: PowerX Semiconductor Corporation, Hsinchu County (TW)

(72) Inventors: Bo-Zhou Ke, Hsinchu County (TW); Sheng-An Ko, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 171 days.

(21) Appl. No.: 18/765,366

(22) Filed: Jul. 8, 2024

(65) Prior Publication Data

US 2025/0337322 A1 Oct. 30, 2025

(30) Foreign Application Priority Data

Apr. 29, 2024 (TW) ................................. 113116054

(51) Int. Cl.
| | |
|---|---|
| *H02M 3/158* | (2006.01) |
| *H02M 1/00* | (2007.01) |
| *H02M 1/088* | (2006.01) |
| *H02M 3/157* | (2006.01) |

(52) U.S. Cl.
CPC ......... *H02M 3/157* (2013.01); *H02M 1/0009* (2021.05); *H02M 1/088* (2013.01); *H02M 3/158* (2013.01)

(58) Field of Classification Search
CPC .. H02M 1/0009; H02M 1/0025; H02M 1/088; H02M 3/158; H02M 3/157
See application file for complete search history.

(56) References Cited

U.S. PATENT DOCUMENTS

| | | | |
|---|---|---|---|
| 8,624,573 B2 * | 1/2014 | Yu .......................... | H02M 3/158 |
| | | | 323/285 |
| 11,444,533 B2 | 9/2022 | Wu et al. | |
| 2012/0274295 A1 * | 11/2012 | Lin ..................... | H02M 3/1582 |
| | | | 323/282 |
| 2019/0268996 A1 * | 8/2019 | Lee ........................ | H05B 47/10 |
| 2021/0264964 A1 | 8/2021 | Puthenthermadam et al. | |

(Continued)

FOREIGN PATENT DOCUMENTS

| | | |
|---|---|---|
| CN | 102761249 A | 10/2012 |
| TW | 200417149 A | 9/2004 |
| TW | 202310547 A | 3/2023 |

*Primary Examiner* — Sisay G Tiku
(74) *Attorney, Agent, or Firm* — CKC & Partners Co., LLC

(57) ABSTRACT

A power stage circuit includes a switch circuit, a driving circuit and a current monitoring circuit. The driving circuit drives the switch circuit according to a control signal to generate an output current signal. The current monitoring circuit includes a current sensing circuit, a virtual current signal generation circuit and a signal combination circuit. The current sensing circuit senses the output current signal to generate a low-side current signal. The virtual current signal generation circuit generates a low-side voltage signal according to the low-side current signal, generates and adjusts a digital signal according to a comparison result of the low-side voltage signal and a virtual voltage signal, adjusts the virtual voltage signal according to the digital signal, and generates a virtual current signal according to the virtual voltage signal. The signal combination circuit generates a current monitoring signal according to the low-side current signal and the virtual current signal.

20 Claims, 7 Drawing Sheets

(56)          References Cited

U.S. PATENT DOCUMENTS

| | | | |
|---|---|---|---|
| 2022/0102969 A1* | 3/2022 | Aoki | H02H 3/087 |
| 2022/0368225 A1* | 11/2022 | Zhou | H02M 3/158 |
| 2025/0211108 A1* | 6/2025 | Wong | H02M 3/157 |
| 2025/0253755 A1* | 8/2025 | Chen | H02M 3/158 |

* cited by examiner

POWER STAGE CIRCUIT AND VIRTUAL CURRENT SIGNAL GENERATION METHOD

CROSS-REFERENCE TO RELATED APPLICATION

This application claims priority to Taiwan Application Serial Number 113116054, filed on Apr. 29, 2024, which is herein incorporated by reference in its entirety.

BACKGROUND

Field of Invention

This disclosure relates to a power stage circuit and a virtual current signal generation method, in particular to a power stage circuit and a virtual current signal generation method which are applicable to a power convertor circuit.

Description of Related Art

In some related applications of a smart power stage module, the smart power stage module is often required to provide a current monitoring signal in proportional to an inductance current. Some related arts add a variety of additional electronic components to the power stage module to fulfill the requirements. However, those additional electronic components cause a dramatic increase in cost to those related arts. Therefore, it is necessary to propose new circuits to solve the above problems.

SUMMARY

An aspect of present disclosure relates to a power stage circuit. The power stage circuit comprises a switch circuit, a driving circuit and a current monitoring circuit. The switch circuit is coupled to an output terminal of the power stage circuit, is configured to receive an input voltage signal, and comprises a high-side switch and a low-side switch. The output terminal is coupled to a load terminal through an inductance element. The driving circuit is coupled to the switch circuit, and is configured to drive the switch circuit according to a control signal, to generate an output voltage signal at the load terminal and generate an output current signal through the inductance element. The current monitoring circuit comprises a current sensing circuit, a virtual current signal generation circuit and a signal combination circuit. The current sensing circuit is coupled to the switch circuit, and is configured to sense the output current signal during each turned-on period of the low-side switch, to generate a low-side current signal. The virtual current signal generation circuit is coupled to the current sensing circuit, is configured to generate a low-side voltage signal according to the low-side current signal, is configured to generate a digital signal, is configured to adjust the digital signal according to a comparison result of the low-side voltage signal and a virtual voltage signal, is configured to adjust the virtual voltage signal according to the digital signal so that the virtual voltage signal approximates the low-side voltage signal, and is configured to generate a virtual current signal according to the virtual voltage signal. The signal combination circuit is coupled to the current sensing circuit and the virtual current signal generation circuit, and is configured to generate a current monitoring signal according to the low-side current signal and the virtual current signal. In a linear mode, the virtual current signal generation circuit is configured to compare the low-side voltage signal and the virtual voltage signal at intervals according to a first time. In the linear mode, the virtual current signal generation circuit is configured to adjust the digital signal multiple times by a first adjustment amplitude according to the comparison result of the low-side voltage signal and the virtual voltage signal, and the first adjustment amplitude is a fixed value.

Another aspect of present disclosure relates to a power stage circuit. The power stage circuit comprises a switch circuit, a driving circuit and a current monitoring circuit. The switch circuit is coupled to an output terminal of the power stage circuit, is configured to receive an input voltage signal, and comprises a high-side switch and a low-side switch. The output terminal is coupled to a load terminal through an inductance element. The driving circuit is coupled to the switch circuit, and is configured to drive the switch circuit according to a control signal, to generate an output voltage signal at the load terminal and generate an output current signal through the inductance element. The current monitoring circuit comprises a current sensing circuit, a virtual current signal generation circuit and a signal combination circuit. The current sensing circuit is coupled to the switch circuit, and is configured to sense the output current signal during each turned-on period of the low-side switch, to generate a low-side current signal. The virtual current signal generation circuit is coupled to the current sensing circuit, is configured to generate a low-side voltage signal according to the low-side current signal, is configured to generate a digital signal, is configured to adjust the digital signal according to a comparison result of the low-side voltage signal and a virtual voltage signal in a first mode or a second mode, is configured to adjust the virtual voltage signal according to the digital signal so that the virtual voltage signal approximates the low-side voltage signal, and is configured to generate a virtual current signal according to the virtual voltage signal. The signal combination circuit is coupled to the current sensing circuit and the virtual current signal generation circuit, and is configured to generate a current monitoring signal according to the low-side current signal and the virtual current signal. In the first mode, the virtual current signal generation circuit is configured to adjust the digital signal multiple times by a first adjustment amplitude, and the first adjustment amplitude is gradually changed as a number of times of adjusting the digital signal is increased. In the second mode, the virtual current signal generation circuit is configured to adjust the digital signal multiple times by a second adjustment amplitude, and the second adjustment amplitude is a fixed value.

Another aspect of present disclosure relates to a virtual current signal generation method applicable to a power stage circuit. The power stage circuit comprises a switch circuit and a driving circuit. The virtual current signal generation method comprises: driving the switch circuit according to a control signal when the power stage circuit is turned on; determining the power stage circuit entering a binary mode or a linear mode according to a binary mode signal and a linear mode signal; adjusting a digital signal multiple times by a first adjustment amplitude according to a comparison result of a low-side voltage signal and a virtual voltage signal when the power stage circuit enters the binary mode, wherein the first adjustment amplitude is gradually changed as a number of times of adjusting the digital signal is increased; adjusting the digital signal multiple times by a second adjustment amplitude according to the comparison result of the low-side voltage signal and the virtual voltage signal when the power stage circuit enters the linear mode, wherein the second adjustment amplitude is a fixed value; adjusting the virtual voltage signal according to the adjusted digital signal so that the virtual voltage signal approximates the low-side voltage signal; and generating a virtual current signal according to the virtual voltage signal.

In sum, by generating the virtual current signal in proportion to the output current signal through the virtual current signal generation circuit, the power stage circuit of the present disclosure can complete the current sensing during the turned-on period of the low-side switch, and combine the virtual current signal and the low-side current signal obtained through the current sensing to generate the current monitoring signal. In addition, the current monitoring circuit of the present disclosure saves a number of components significantly, and further adjusts the virtual voltage signal in a digital way for correcting the virtual current signal and ensures the stability of the virtual current signal. Thus, the power stage circuit and its current monitoring circuit of the present disclosure have advantages of low cost, being applicable to the applications for low duty ratio, generating a current monitoring signal of high stability and high accuracy, etc.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

As used herein, "coupled" and "connected" may be used to indicate that two or more elements physical or electrical contact with each other directly or indirectly, and may also be used to indicate that two or more elements cooperate or interact with each other.

Figure 1:
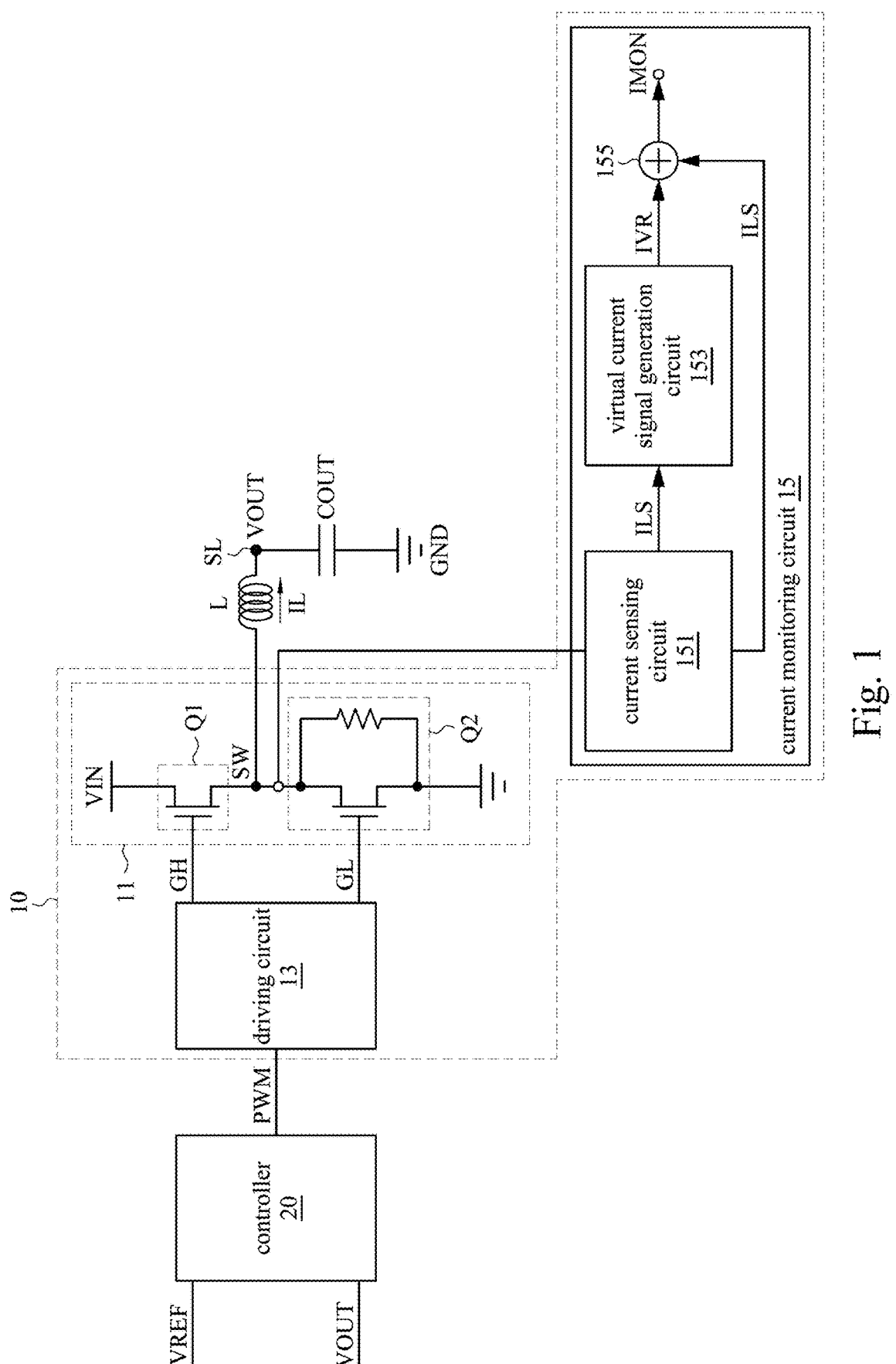
FIG. 1 is a circuit block diagram of a power stage circuit and a controller in accordance with some embodiments of the present disclosure.

Referring to FIG. 1, FIG. 1 is a circuit block diagram of a power stage circuit 10 and a controller 20 in accordance with some embodiments of the present disclosure. In some embodiments, the power stage circuit 10 and the controller 20 can constitute a power convertor circuit such as a DC/DC convertor. The power stage circuit 10 can be coupled to a load terminal SL through an inductance element L, and the load terminal SL can be electrically coupled to a load device (not shown) such as a central processing unit (CPU). In such way, the power convertor circuit constituted by the power stage circuit 10 and the controller 20 can supply power to the load device.

In some embodiments, as shown in FIG. 1, the power stage circuit 10 comprises a switch circuit 11, a driving circuit 13 and a current monitoring circuit 15. Also, the switch circuit 11 comprises a high-side switch Q1 and a low-side switch Q2. The high-side switch Q1 is coupled between an input voltage signal VIN and an output terminal SW of the power stage circuit 10, and the low-side switch Q2 is coupled between the output terminal SW and a ground voltage GND. It can be seen from the above descriptions that the switch circuit 11 is coupled to the output terminal SW, and is configured to receive the input voltage signal VIN. In addition, the output terminal SW is coupled to the load terminal SL through the inductance element L. In particular, each of the hide-side switch Q1 and the low-side switch Q2 can be implemented with a transistor (e.g., a metal oxide semiconductor (MOS) transistor), but the present disclosure is not limited thereto.

In some embodiments, as shown in FIG. 1, the driving circuit 13 is coupled to the high-side switch Q1, the low-side switch Q2 and the controller 20. The driving circuit 13 is configured to receive a control signal PWM outputted by the controller 20 and further to generate a high-side driving signal GH and a low-side driving signal GL to the high-side switch Q1 and the low-side switch Q2 according to the control signal PWM, respectively. In particular, the control signal PWM can be a periodic signal such as a pulse width modulation signal, and the driving circuit 13 can be implemented with a gate driver. That is to say, the high-side driving signal GH and the low-side driving signal GL can be outputted to a gate terminal of the transistor in the high-side switch Q1 and a gate terminal of the transistor in the low-side switch Q2, respectively.

Figure 2:
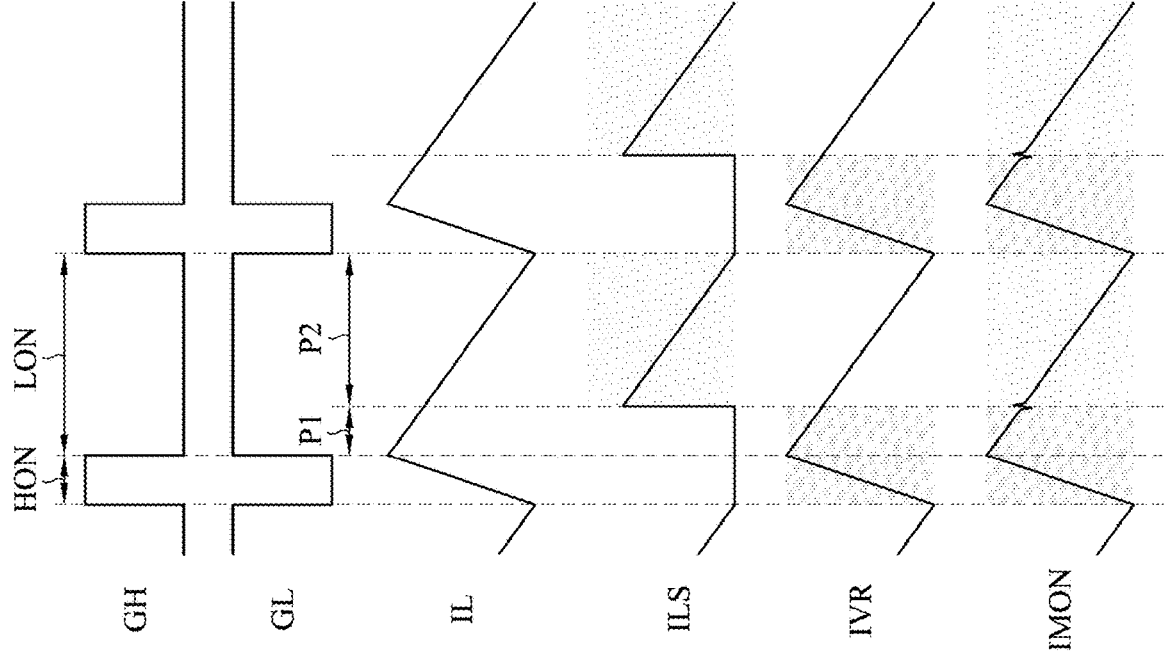
FIG. 2 is a waveform diagram of some signals related to a power stage circuit in accordance with some embodiments of the present disclosure.

Referring to FIG. 2, FIG. 2 is a waveform diagram of some signals related to the power stage circuit 10. In some embodiments, as shown in FIG. 2, both the high-side driving signal GH and the low-side driving signal GL are periodic signals. The high-side driving signal GH and the control signal PWM are in phase substantially. For example, when the high-side driving signal GH is at an enable level (e.g., a high voltage level as shown in FIG. 2), the control signal PWM may be also at the enable level. The high-side driving signal GH and the low-side driving signal GL are out of phase substantially. For example, when the high-side driving signal GH is at a disable level (e.g., a low voltage level as shown in FIG. 2), the low-side driving signal GL is at the enable level. In particular, the enable level can be a voltage level capable of turning the high-side switch Q1 or the low-side switch Q2 on, and the disable level can be a voltage level capable of turning the high-side switch Q1 or the low-side switch Q2 off. In such configurations, the high-side driving signal GH at the enable level is corresponding to a turned-on period HON of the high-side switch Q1 (i.e., a turned-off period of the low-side switch Q2), and the low-side driving signal GL at the enable level is corresponding to a turned-on period LON of the low-side switch Q2 (i.e., a turned-off period of the high-side switch Q1).

It can be seen from the above descriptions that the hide-side switch Q1 and the low-side switch Q2 in FIG. 1 are alternatively turned on through the high-side driving signal GH and the low-side driving signal GL in FIG. 2, so as to generate a square wave voltage signal (not shown) at the output terminal SW. It should be understood that a voltage level of this square wave voltage signal is switched between a voltage level of the input voltage signal VIN and a voltage level of the ground voltage GND.

In the embodiments of FIG. 1, a capacitance element COUT is coupled between the load terminal SL and the ground voltage GND, to constitute a circuit (e.g., a low-pass filter circuit) with the inductance element L. This circuit is configured to process the square wave voltage signal, to generate an output voltage signal VOUT at the load terminal SL. It should be understood that the power convertor circuit can supply the power to the load device through the output voltage signal VOUT.

As shown in FIG. 1 again, when the square wave voltage signal and the output voltage signal VOUT are generated at two terminals of the inductance element L respectively, an output current signal IL is generated and flows through the inductance element L. In some embodiments, as shown in FIG. 2, the output current signal IL is a triangle wave or ramp signal.

As can be seen from the above descriptions, in some embodiments, the driving circuit 13 is coupled to the switch circuit 11, and is configured to drive the switch circuit 11 according to the control signal PWM. Accordingly, the output voltage signal VOUT is generated at the load terminal SL, and the output current signal IL is generated through the inductance element L.

In addition, in the embodiments of FIG. 1, the controller 20 is configured to receive and compare the output voltage signal VOUT and a reference voltage signal VREF, and is configured to adjust a duty ratio of the control signal PWM according to a comparison result of the output voltage signal VOUT and the reference voltage signal VREF, so as to change a switching frequency of the high-side switch Q1 and a switching frequency of the low-side switch Q2.

In some embodiments, the current monitoring circuit 15 comprises a current sensing circuit 151, a virtual current signal generation circuit 153 and a signal combination circuit 155. As shown in FIG. 1 again, the current sensing circuit 151 is coupled to the switch circuit 11, for example, coupled to a node between the output terminal SW and the low-side switch Q2. The virtual current signal generation circuit 153 is coupled to the current sensing circuit 151. The signal combination circuit 155 is coupled to the current sensing circuit 151 and the virtual current signal generation circuit 153.

In some embodiments, the current sensing circuit 151 is configured to sense the output current signal IL during each turned-on period LON of the low-side switch Q2 (i.e., to sense a current signal flowing through the low-side switch Q2), to generate a low-side current signal ILS. In some further embodiments, as shown in FIG. 2, the current sensing circuit 151 does not sense the output current signal IL during a first period P1 in each turned-on period LON of the low-side switch Q2, and senses the output current signal IL during a second period P2 in each turned-on period LON of the low-side switch Q2, so as to generate the low-side current signal ILS. It can be seen from the above descriptions, the low-side current signal ILS is substantially the same as the output current signal IL during each second period P2.

In some embodiments, the virtual current signal generation circuit 153 is configured to receive the low-side current signal ILS and generate a low-side voltage signal VLS (not shown in FIGS. 1 and 2) according to the low-side current signal ILS. The virtual current signal generation circuit 153 is configured to adjust a virtual voltage signal VVR (not shown in FIGS. 1 and 2) according to a comparison result of the low-side voltage signal VLS and the virtual voltage signal VVR so that the virtual voltage signal VVR approximates the low-side voltage signal VLS. The virtual current signal generation circuit 153 is configured to generate a virtual current signal IVR according to the virtual voltage signal VVR. By adjusting the virtual voltage signal VVR, the virtual current signal IVR can be corrected so that the virtual current signal IVR substantially approximates or equals the output current signal IL. The generations of the low-side voltage signal VLS, the virtual voltage signal VVR and the virtual current signal IVR would be described in detail later with reference to FIGS. 3-6. Notably, as shown in FIG. 2, the virtual current signal IVR, which is generated according to the virtual voltage signal VVR approximating the low-side voltage signal VLS, is substantially the same as the output current signal IL.

In some embodiments, the signal combination circuit 155 is configured to receive the low-side current signal ILS and the virtual current signal IVR and generate a current monitoring signal IMON according to the low-side current signal ILS and the virtual current signal IVR. For example, as shown in FIG. 2, the signal combination circuit 155 combines the virtual current signal IVR to which each turned-on period HON of the high-side switch Q1 and the first period P1 in each turned-on period LON of the low-side switch Q2 are corresponding and the low-side current signal ILS to which the second period P2 in each turned-on period LON of the low-side switch Q2 is corresponding, to generate the current monitoring signal IMON.

In the above embodiments, there are two reasons that the current sensing circuit 151 only performs current sensing during the second period P2 in each turned-on period LON of the low-side switch Q2. The first reason is that the turned-on period HON of the high-side switch Q1 is too short, such that it is unable to provide sufficient time for the current sensing circuit 151 to complete the current sensing in some practical applications (e.g., applications for a low duty ratio). In comparison to the turned-on period HON of the high-side switch Q1, the turned-on period LON of the low-side switch Q2 can provide sufficient time for the current sensing circuit 151 to complete the current sensing. The second reason is that the output current signal IL may still be unstable during the first period P1 of each turned-on period LON of the low-side switch Q2 and may become stable only during the second period P2 of each turned-on period LON of the low-side switch Q2. Through sensing the stable output current signal IL during the second period P2 by the current sensing circuit 151, a reliability of the low-side current signal ILS can be ensured. Notably, an accuracy of the virtual current signal IVR and the current monitoring signal IMON which are generated based on the low-side current signal ILS can be also ensured.

Figure 3:
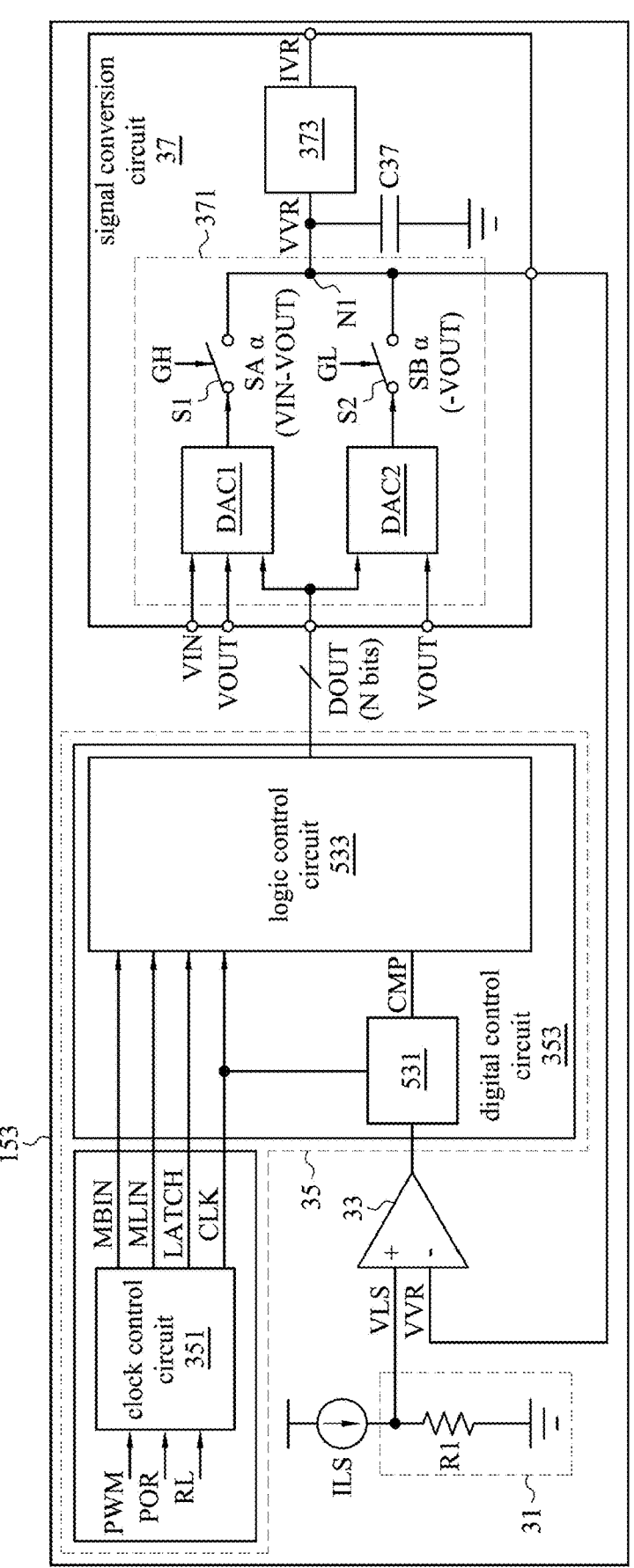
FIG. 3 is a circuit schematic diagram of a virtual current signal generation circuit in accordance with some embodiments of the present disclosure.

The circuit structure of the virtual current signal generation circuit 153 would be described with reference to FIG. 3. Referring to FIG. 3, FIG. 3 is a circuit schematic diagram of the virtual current signal generation circuit 153 in accordance with some embodiments of the present disclosure. In some embodiments, the virtual current signal generation circuit 153 comprises a current-to-voltage conversion circuit 31, a comparison circuit 33, a digital circuit 35 and a signal conversion circuit 37.

In some embodiments, the current-to-voltage conversion circuit 31 is coupled to the current sensing circuit 151 in FIG. 1 to receive the low-side current signal ILS. The current-to-voltage conversion circuit 31 is configured to convert the low-side current signal ILS to the low-side voltage signal VLS. As shown in FIG. 3, the current-to-voltage conversion circuit 31 can be implemented with a resistance element R1. In particular, one terminal of the resistance element R1 can be coupled to the ground voltage GND, and the other terminal of the resistance element R1 can allow the low-side current signal ILS to flow in. That is to say, the low-side current signal ILS can flow through the resistance element R1 and flow into the ground voltage GND, so that the low-side voltage signal VLS is generated at the other terminal of the resistance element R1.

In some embodiments, the comparison circuit 33 is coupled to the current-to-voltage conversion circuit 31, the digital circuit 35 and the signal conversion circuit 37, and is configured to compare the low-side voltage signal VLS and the virtual voltage signal VVR. In particular, a first input terminal (e.g., a non-inverting input terminal) of the comparison circuit 33 is coupled to the other terminal of the resistance element R1 to receive the low-side voltage signal VLS. A second input terminal (e.g., an inverting input terminal) of the comparison circuit 33 is coupled to the signal conversion circuit 37 to receive the virtual voltage signal VVR. An output terminal of the comparison circuit 33 is coupled to the digital circuit 35 to provide the comparison result of the low-side voltage signal VLS and the virtual voltage signal VVR to the digital circuit 35.

In the configurations, the digital circuit 35 is coupled to the comparison circuit 33 and the signal conversion circuit 37 and configured to generate a digital signal DOUT to the signal conversion circuit 37. As shown in FIG. 3, the digital signal DOUT is a signal of N bits. In some further embodiments, the digital circuit 35 comprises a clock control circuit 351 and a digital control circuit 353, and the digital control circuit 353 comprises a sample and hold circuit 531 and a logic control circuit 533. The clock control circuit 351 is coupled to the sample and hold circuit 531 and the logic control circuit 533. The sample and hold circuit 531 is further coupled to the comparison circuit 33 and the logic control circuit 533, and the logic control circuit 533 is further coupled to the signal conversion circuit 37.

In accordance with the descriptions of the above embodiments, the clock control circuit 351 is configured to receive the control signal PWM, a power-on reset voltage signal POR and a reload signal RL and generate a clock signal CLK, a latch signal LATCH, a binary mode signal MBIN and a linear mode signal MLIN according to the control signal PWM, the power-on reset voltage signal POR and the reload signal RL. Also, the digital control circuit 353 is configured to receive the clock signal CLK, the latch signal LATCH, the binary mode signal MBIN, the linear mode signal MLIN and the comparison result of the low-side voltage signal VLS and the virtual voltage signal VVR to adjust and output the digital signal DOUT, which would be described in detail below with reference to FIGS. 4-6.

In some embodiments, the signal conversion circuit 37 is coupled to the digital circuit 35 and the comparison circuit 33. The signal conversion circuit 37 is configured to receive the digital signal DOUT, the input voltage signal VIN and the output voltage VOUT and generate the virtual voltage signal VVR according to the digital signal DOUT, the input voltage signal VIN and the output voltage VOUT, to generate the virtual current signal IVR.

In some further embodiments, as shown in FIG. 3, the signal conversion circuit 37 comprises a virtual voltage signal generation circuit 371, a voltage-to-current conversion circuit 373 and a capacitance element C37. The virtual voltage signal generation circuit 371 comprises a first digital-to-analog conversion circuit DAC1, a second digital-to-analog conversion circuit DAC2, a first switch S1 and a second switch S2. The first digital-to-analog conversion circuit DAC1 and the second digital-to-analog conversion circuit DAC2 are coupled to an output terminal N1 of the virtual voltage signal generation circuit 371 through the first switch S1 and the second switch S2, respectively. The virtual voltage signal generation circuit 371 is coupled to the second input terminal of the comparison circuit 33, an input terminal of the voltage-to-current conversion circuit 373 and one terminal of the capacitance element C37 through the output terminal N1. The other terminal of the capacitance element C37 is coupled to the ground voltage GND, and an output terminal of the voltage-to-current conversion circuit 373 is coupled to the signal combination circuit 155 in FIG. 1. However, the present disclosure is not limited herein. For example, in some embodiments, the capacitance element C37 can be included in the virtual voltage signal generation circuit 371.

In accordance with the descriptions of the above embodiments, the first digital-to-analog conversion circuit DAC1 is configured to receive the digital signal DOUT, the input voltage signal VIN and the output voltage VOUT and perform a voltage-to-current conversion on a calculation result of the input voltage signal VIN minus the output voltage signal VOUT according to the digital signal DOUT to generate a first current signal SA. In particular, the first current signal SA can be obtained through multiplying the calculation result of the input voltage signal VIN minus the output voltage signal VOUT by a first parameter. The second digital-to-analog conversion circuit DAC2 is configured to receive the digital signal DOUT and the output voltage VOUT and perform a voltage-to-current conversion on a negative number of the output voltage signal VOUT according to the digital signal DOUT to generate a second current signal SB. In particular, the second current signal SB can be obtained through multiplying the negative number of the output voltage signal VOUT by the second parameter.

In the above embodiments, each of the first digital-to-analog conversion circuit DAC1 and the second digital-to-analog conversion circuit DAC2 can be implemented with a transconductance amplifier, in which the digital signal DOUT is configured to adjust gains of the transconductance amplifiers to control the first parameter and the second parameter respectively, however, the present disclosure is not limited thereto. In some embodiments, each of the first digital-to-analog conversion circuit DAC1 and the second digital-to-analog conversion circuit DAC2 can be implemented with a circuit constituted by a current source, a resistor and a buffer, in which the digital signal DOUT is configured to adjust resistances of the resistors to control the first parameter and the second parameter respectively.

Referring to FIGS. 2 and 3 together, in some embodiments, the first switch S1 is switched to a turned-on state when the high-side driving signal GH is at the enable level, and the second switch S2 is switched to the turned-on state when the low-side driving signal GL is at the enable level.

That is to say, the first switch S1 and the second switch S2 are alternatively switched to the turned-on state. In such configurations, the capacitance element C37 can be charged by the first current signal SA generated by the first digital-to-analog conversion circuit DAC1 when the first switch S1 is in the turned-on state, and can be charged by the second current signal SB generated by the second digital-to-analog conversion circuit DAC2 when the second switch S2 is in the turned-on state, such that the virtual voltage signal VVR is generated at the output terminal N1.

As can be seen from the above descriptions, in some embodiments, the virtual voltage signal generation circuit 371 is configured to convert the calculation result of the input voltage signal VIN minus the output voltage signal VOUT to the first current signal SA according to the digital signal DOUT during each turned-on period HON of the high-side switch Q1 and convert the negative number of the output voltage signal VOUT to the second current signal SB according to the digital signal DOUT during each turned-on period LON of the low-side switch Q2, to generate the virtual voltage signal VVR.

In some embodiments, the voltage-to-current conversion circuit 373 is configured to convert the virtual voltage signal VVR to the virtual current signal IVR. For example, the voltage-to-current conversion circuit 373 can be implemented with a resistor and a current mirror. The resistor can be coupled between the output terminal N1 and the ground voltage GND to generate a current signal flowing through the resistor. Also, the current mirror can generate the virtual current signal IVR by duplicating the current signal.

Figure 4:
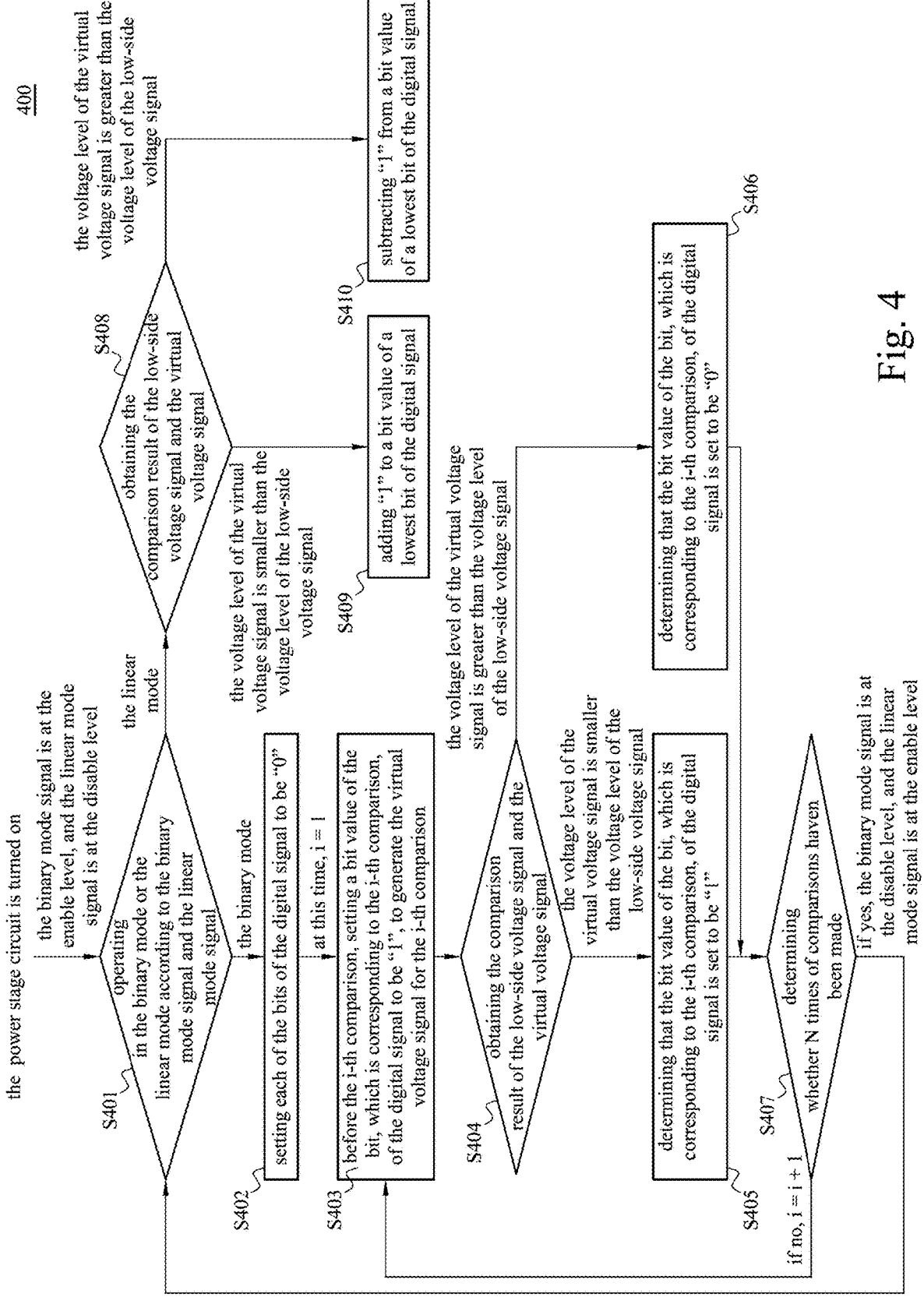
FIG. 4 is a flow diagram of an adjustment method for a digital signal in accordance with some embodiments of the present disclosure.
Figure 5:
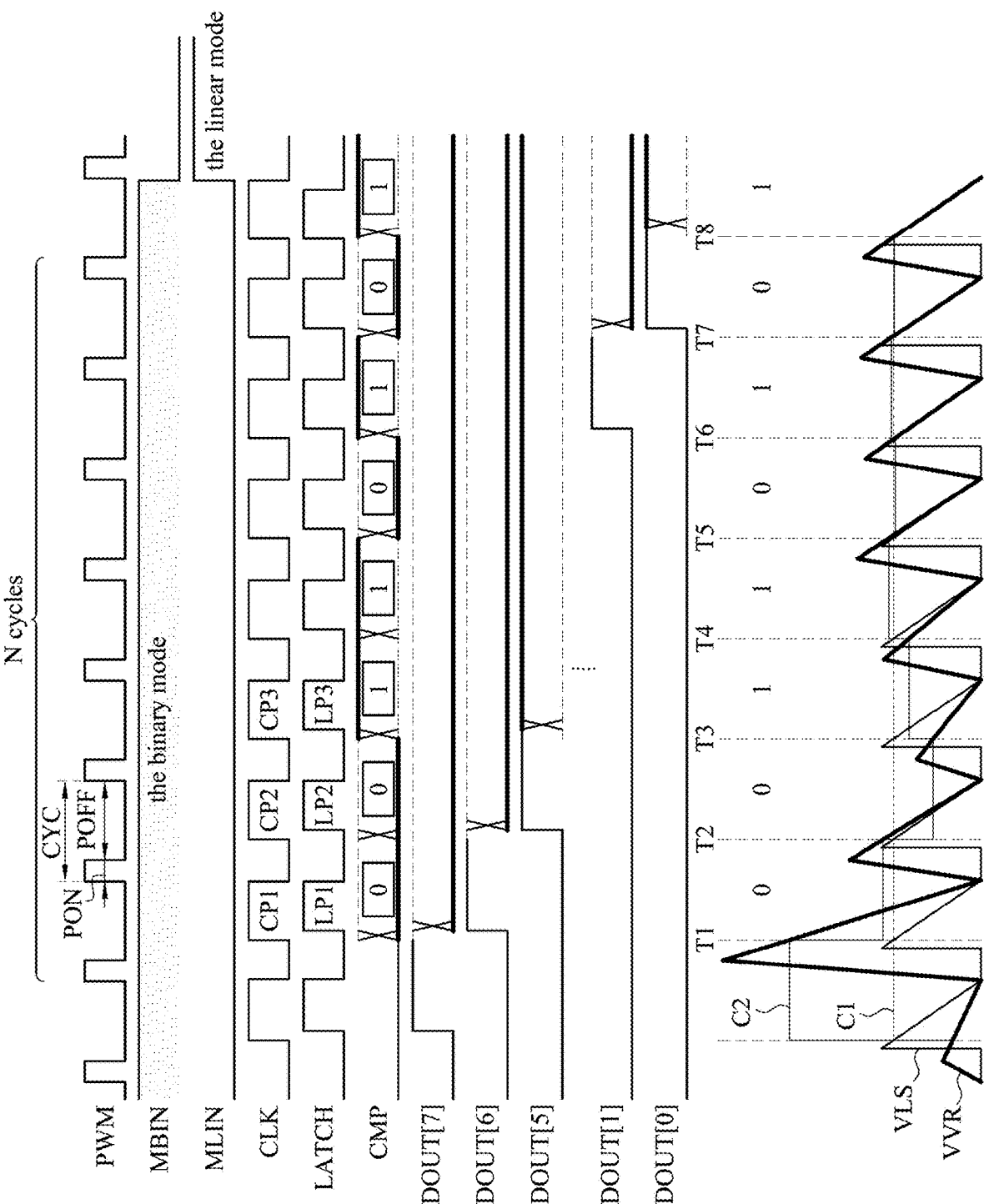
FIG. 5 is a timing diagram of some signals related to a virtual current signal generation circuit in a binary mode in accordance with some embodiments of the present disclosure.
Figure 6:
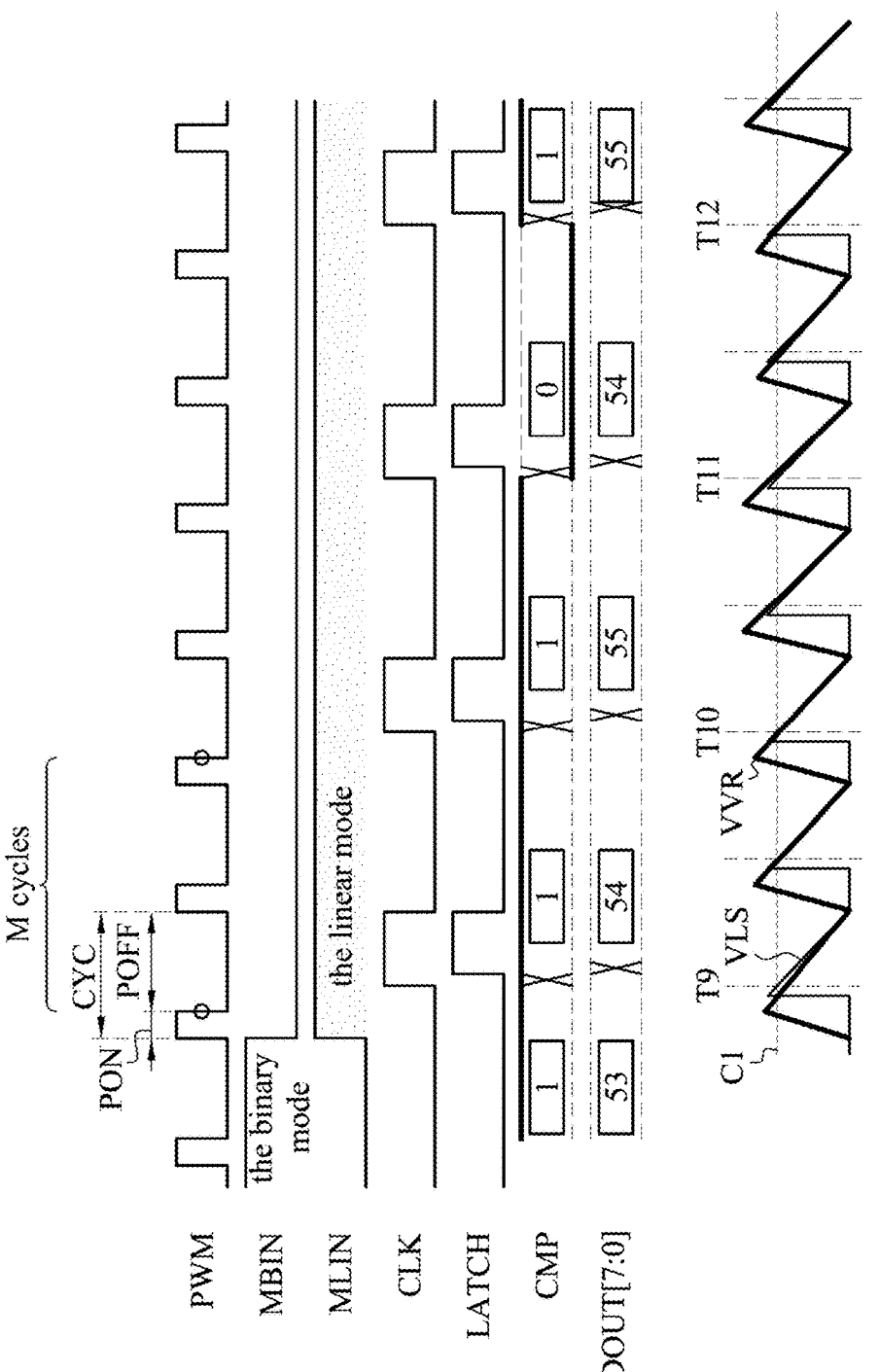
FIG. 6 is a timing diagram of some signals related to a virtual current signal generation circuit in a linear mode in accordance with some embodiments of the present disclosure.

Referring to FIG. 4, FIG. 4 is a flow diagram of an adjustment method 400 for the digital signal DOUT performed by the digital circuit 35 in accordance with some embodiments of the present disclosure. In some embodiments, as shown in FIG. 4, the adjustment method 400 comprises operations S401-S410. The adjustment method 400 would be described in detail below with reference to FIGS. 5 and 6. FIG. 5 is a timing diagram of some signals related to the virtual current signal generation circuit 153 in a binary mode in accordance with some embodiments of the present disclosure. FIG. 6 is a timing diagram of some signals related to the virtual current signal generation circuit 153 in a linear mode in accordance with some embodiments of the present disclosure.

In some embodiments, the digital circuit 35 performs the adjustment method 400 after the power stage circuit 10 is turned on. In particular, after the power stage circuit 10 is turned on, the power-on reset voltage signal POR is switched from the disable level to the enable level to trigger the clock control circuit 351 to generate the clock signal CLK, the latch signal LATCH, the binary mode signal MBIN and the linear mode signal MLIN correspondingly.

For example, as shown in FIG. 4, the clock control circuit 351 can switch the binary mode signal MBIN and the linear mode signal MLIN to the enable level and the disable level, respectively. The clock control circuit 351 can invert the control signal PWM and delay the inverted control signal PWM once, to generate the clock signal CLK as shown in FIG. 5. Also, the clock control circuit 351 can delay the inverted control signal PWM twice, to generate the latch signal LATCH as shown in FIG. 5. Accordingly, the operation S401 is executed.

In the operation S401, the digital circuit 35 is switched between two different modes according to the binary mode signal MBIN and the linear mode signal MLIN, that is, the digital circuit 35 is operated in the binary mode or the linear mode. For example, as shown in FIG. 5, the digital control circuit 353 in the digital circuit 35 controls the virtual current signal generation circuit 153 to operate in the binary mode according to the binary mode signal MBIN at the enable level and the linear mode signal MLIN at the disable level. In some embodiments, the binary mode is regarded as a first mode, the linear mode is regarded as a second mode, and the first mode is different from the second mode. The binary mode signal MBIN is regarded as a first mode signal, and the linear mode signal MLIN is regarded as a second mode signal.

In some embodiments, in the binary mode, the comparison circuit 33 in FIG. 3 performs N comparisons of the low-side voltage signal VLS and the virtual voltage signal VVR. In the embodiments of FIG. 5, the digital signal DOUT is a signal of 8 bits, that is, N is 8. In other words, the digital signal DOUT comprises 8 bits DOUT[0]-DOUT[7]. In addition, multiple time points T1-T8 in FIG. 5 represent the time points when the 8 comparisons are performed, respectively. Before the N comparisons, the operation S402 is performed.

In the operation S402, the logic control circuit 533 sets each of the bits of the digital signal DOUT to be "0". In the embodiments that the digital signal DOUT is the signal of 8 bits, the digital signal DOUT is set to "00000000".

In the operation S403, before the i-th comparison, the logic control circuit 533 sets a bit value of the bit, which is corresponding to the i-th comparison, of the digital signal DOUT to be "1", to generate the virtual voltage signal VVR for the i-th comparison. It should be understood that i can be any integer from 1 to 8 in accordance with the embodiments of FIG. 5.

For example, before the first comparison (corresponding to the time point T1 in FIG. 5), the bit value of the first bit DOUT[7] (e.g., the highest bit) of the digital signal DOUT is set or switched to "1". At this time, the digital signal DOUT is "10000000". As the descriptions of the embodiments of FIG. 3, the virtual voltage signal generation circuit 371 then performs the voltage-to-current conversion according to the digital signal DOUT, the input voltage signal VIN and the output voltage signal VOUT, to output the virtual voltage signal VVR for the first comparison.

In the operation S404, the digital control circuit 353 obtains the comparison result of the low-side voltage signal VLS and the virtual voltage signal VVR. In some embodiments, as shown in FIG. 3, the sample and hold circuit 531 is triggered by a rising edge (corresponding to the time point T1) of one pulse CP1 of the clock signal CLK to sample and hold the comparison result of the low-side voltage signal VLS and the virtual voltage signal VVR. Then, the sample and hold circuit 531 outputs a comparison signal CMP which represents the comparison result of the low-side voltage signal VLS and the virtual voltage signal VVR to the logic control circuit 533. As shown in FIG. 5, the comparison signal CMP at the disable level means that the voltage level of the virtual voltage signal VVR is greater than the voltage level of the low-side voltage signal VLS. In such condition, the operation S406 is performed.

In the operation S406, the logic control circuit 533 determines that the bit value of the first bit (i.e., the bit corresponding to the first comparison) of the digital signal DOUT is set to "0". In some embodiments, the logic control circuit 533 is triggered by a rising edge of one pulse LP1, which follows the time point T1, of the latch signal LATCH to set the bit value of the first bit of the digital signal DOUT to be "0" according to the comparison signal CMP at the disable level. Accordingly, the operation S407 is performed.

In the operation S407, the digital circuit 35 determines whether N times of comparisons haven been made. For example, the digital circuit 35 can count the number of generated pulses in the control signal PWM, the clock signal CLK or the latch signal LATCH through a pulse counter (not shown) in the clock control circuit 351, and determine whether the N times of comparisons haven been made according to the number of generated pulses. After the first comparison, the number of generated pulses counted by the clock control circuit 351 should be 1 (i.e., the number of generated pulses is still not 8), and thus the operations S403 and S404 are performed again.

As shown in FIG. 5, before the second comparison, the bit value of the second bit DOUT[6] of the digital signal DOUT is set or switched to "1". At this time, the digital signal DOUT is "01000000". It should be understood that the virtual voltage signal generation circuit 371 uses this digital signal DOUT to output the virtual voltage signal VVR for the second comparison. The sample and hold circuit 531 is triggered by a rising edge (corresponding to the time point T2) of one pulse CP2 of the clock signal CLK to output the comparison signal CMP at the disable level to the logic control circuit 533. In such condition, the operation S406 is performed again. Similarly, the logic control circuit 533 determines that the bit value of the second bit (i.e., the bit corresponding to the second comparison) of the digital signal DOUT is set to "0", and is triggered by a rising edge of one pulse LP2, which follows the time point T2, of the latch signal LATCH to set the bit value of the second bit of the digital signal DOUT to be "0" according to the com-parison signal CMP at the disable level. Accordingly, the operation S407 is performed again. It should be understood that the number of generated pulses counted by the clock control circuit 351 should be 2 (i.e., the number of generated pulses is still not 8) after the second comparison, and thus the operations S403 and S404 are performed again.

As shown in FIG. 5 again, before the third comparison, the bit value of the third bit DOUT[5] of the digital signal DOUT is set or switched to "1". At this time, the digital signal DOUT is "00100000". It should be understood that the virtual voltage signal generation circuit 371 uses this digital signal DOUT to output the virtual voltage signal VVR for the third comparison. The sample and hold circuit 531 is triggered by a rising edge (corresponding to the time point T3) of one pulse CP3 of the clock signal CLK to output the comparison signal CMP at the enable level to the logic control circuit 533. As shown in FIG. 5, the comparison signal CMP at the enable level means that the voltage level of the virtual voltage signal VVR is smaller than the voltage level of the low-side voltage signal VLS. In such condition, the operation S405 is performed.

In the operation S405, the logic control circuit 533 determines that the bit value of the third bit (i.e., the bit corresponding to the third comparison) of the digital signal DOUT is set to "1". The logic control circuit 533 is triggered by a rising edge of one pulse LP3, which follows the time point T3, of the latch signal LATCH to set the bit value of the third bit of the digital signal DOUT to be "1" according to the comparison signal CMP at the enable level. Accord-ingly, after the third comparison, the operation S407 is performed again. Similarly, the number of generated pulses counted by the clock control circuit 351 should be 3 (i.e., the number of generated pulses is still not 8), and thus the operations S403 and S404 are performed again. It should be noted that the digital signal DOUT is adjusted to "00100000" from "00000000" which is set in response to the second comparison. It can therefore be seen that an adjustment amplitude is "00100000", which is represented as "32" in decimal.

The fourth to eighth comparisons can be deduced by analogy according to the descriptions of the first to third comparisons, and therefore are simply described herein. In the fourth comparison, the digital control circuit 353 obtains the comparison result that the voltage level of the virtual voltage signal VVR (which is generated according to the digital signal DOUT set to "00110000") is smaller than the voltage level of the low-side voltage signal VLS at the time point T4 (corresponding to the operations S403 and S404), and sets or switches the bit value of the fourth bit DOUT[4] of the digital signal DOUT to "1" accordingly (correspond-ing to the operation S405). It should be noted that the digital signal DOUT is adjusted to "00110000" from "00100000" set in the third comparison. It can therefore be seen that an adjustment amplitude is "00010000", which is represented as "16" in decimal.

In the fifth comparison, the digital control circuit 353 obtains the comparison result that the voltage level of the virtual voltage signal VVR (which is generated according to the digital signal DOUT set to "00111000") is greater than the voltage level of the low-side voltage signal VLS at the time point T5 (corresponding to the operations S403 and S404), and sets or switches the bit value of the fifth bit DOUT[3] of the digital signal DOUT to "0" accordingly (corresponding to the operation S406).

In the sixth comparison, the digital control circuit 353 obtains the comparison result that the voltage level of the virtual voltage signal VVR (which is generated according to the digital signal DOUT set to "00110100") is smaller than the voltage level of the low-side voltage signal VLS at the time point T6 (corresponding to the operations S403 and S404), and sets or switches the bit value of the sixth bit DOUT[2] of the digital signal DOUT to "1" accordingly (corresponding to the operation S405). It should be noted that the digital signal DOUT is adjusted to "00110100" from "00110000" set in the fifth comparison. It can therefore be seen that an adjustment amplitude is "00000100", which is represented as "4" in decimal.

In the seventh comparison, the digital control circuit 353 obtains the comparison result that the voltage level of the virtual voltage signal VVR (which is generated according to the digital signal DOUT set to "00110110") is greater than the voltage level of the low-side voltage signal VLS at the time point T7 (corresponding to the operations S403 and S404), and sets or switches the bit value of the seventh bit DOUT[1] of the digital signal DOUT to "0" accordingly (corresponding to the operation S406).

In the eighth comparison, the digital control circuit 353 obtains the comparison result that the voltage level of the virtual voltage signal VVR (which is generated according to the digital signal DOUT set to "00110101") is smaller than the voltage level of the low-side voltage signal VLS at the time point T8 (corresponding to the operations S403 and S404), and sets or switches the bit value of the eighth bit DOUT[0] of the digital signal DOUT to "1" accordingly (corresponding to the operation S405). Thus, the digital signal DOUT is set to "00110101" eventually. It should be noted that the digital signal DOUT is adjusted to "00110101" from "00110100" set in the seventh compari-son. It can therefore be seen that an adjustment amplitude is "00000001", which is represented as "1" in decimal.

It can be seen from the above descriptions that in the binary mode, the digital signal DOUT is adjusted four times in total, and the adjustment amplitude of the digital signal DOUT is a non-fixed value. For example, as the number of times of adjusting the digital signal DOUT is increased, the adjustment amplitude is changed from "32" to "16", changed from "16" to "4", and changed from "4" to "1", that is, the adjustment amplitude is gradually decreased.

In accordance with the embodiments of this application, the adjustment amplitude which is used by the digital circuit 35 to adjust or approximate the value of the digital signal DOUT in the binary mode is gradually changed as the number of times of adjusting the digital signal DOUT is increased. In detail, in the binary mode, the adjustment amplitude which is used by the digital circuit 35 to adjust or approximate the digital signal DOUT is gradually decreased as the number of times of adjusting the digital signal DOUT is increased.

In addition, after the eighth comparison, the digital circuit 35 determines that the N times of comparisons have been made (corresponding to the operation S407). Thus, as shown in FIG. 4, the clock control circuit 351 switches the binary mode signal MBIN and the linear mode signal MLIN to the disable level and the enable level, respectively, and the operation S401 is executed again.

In some embodiments of the operation S401, as shown in FIG. 6, the digital control circuit 353 in the digital circuit 35 controls the virtual current signal generation circuit 153 to operate in the linear mode according to the binary mode signal MBIN at the disable level and the linear mode signal MLIN at the enable level. In some embodiments, the digital control circuit 353 controls the virtual current signal generation circuit 153 to enter and operate in the linear mode when the DC/DC convertor of this application is turned on, when the DC/DC convertor of this application is controlled to change the output voltage signal VOUT, or when the power stage circuit 10, which is one phase circuit of a multiphase DC voltage convertor, is turned on.

In accordance with the above descriptions, in some embodiments, the clock control circuit 351 can count the number of generated pulses in the control signal PWM through another pulse counter (not shown) in itself, and determine whether the number of generated pulses has reached M accordingly (which is equivalent to determining whether M cycles CYC of the control signal PWM have passed). In particular, M can be an integer greater than or equal to 2. Based on the above descriptions, as shown in FIG. 6, the clock control circuit 351 can delay one of two adjacent pulses of the clock signal CLK from the other one by M cycles CYC, and can delay one of two adjacent pulses of the latch signal LATCH from the other one by M cycles CYC.

Before the operations S408-S410 in FIG. 4 are described, it should be noted that multiple time points t9-t12 in FIG. 6 represent time points when the comparisons of the low-side voltage signal VLS and the virtual voltage signal VVR are performed, respectively. In addition, in the linear mode, the digital signal DOUT set to "00110101" is represented as "53" in decimal in FIG. 6.

In some embodiments, the operation S408 is performed in response to a rising edge (corresponding to the time point T9) of one pulse of the clock signal CLK in FIG. 6. In the operation S408, the digital control circuit 353 in FIG. 3 obtains the comparison result of the low-side voltage signal VLS and the virtual voltage signal VVR. For example, the digital control circuit 353 generates the comparison signal CMP at the enable level (that is, the comparison signal CMP at the enable level indicates that the voltage level of the virtual voltage signal VVR is smaller than the voltage level of the low-side voltage signal VLS) through the sample and hold circuit 531 at the time point T9. In such condition, the operation S409 is performed in response to a rising edge of one pulse, which follows the time point T9, of the latch signal LATCH in FIG. 6.

In the operation S409, the logic control circuit 533 adds "1" to the bit value of the lowest bit (i.e., the eighth bit) of the digital signal DOUT. It should be understood that by adding "1" to the bit value of the lowest bit of the digital signal DOUT, the digital signal DOUT is changed to "00110110" from "00110101", in which "00110110" can be represented as "54" in decimal. It can therefore be seen that an adjustment amplitude is "00000001", which is represented as "1" in decimal, and an adjustment direction is represented by an upward increase (+). As the above descriptions again, the virtual voltage signal generation circuit 371 uses this digital signal DOUT to output the virtual voltage signal VVR for the next comparison performed by the comparison circuit 33.

After M cycles CYC, the operation S408 is performed again in response to a rising edge (corresponding to the time point T10) of one pulse of the clock signal CLK in FIG. 6. At this time, the digital control circuit 353 still obtains the comparison result indicating that the voltage level of the virtual voltage signal VVR is smaller than the voltage level of the low-side voltage signal VLS (corresponding to the comparison signal CMP at the enable level). Thus, the operation S409 is performed again. Accordingly, the digital signal DOUT is changed to "00110111" from "00110110", in which "00110111" can be represented as "55" in decimal. It can therefore be seen that the adjustment amplitude is "00000001", which is represented as "1" in decimal, and the adjustment direction is represented by the upward increase (+). Then, the virtual voltage signal generation circuit 371 uses this digital signal DOUT again to output the virtual voltage signal VVR for the next comparison performed by the comparison circuit 33.

After M cycles CYC again, the operation S408 is performed again in response to a rising edge (corresponding to the time point T11) of one pulse of the clock signal CLK in FIG. 6. At this time, the digital control circuit 353 obtains the comparison result indicating that the voltage level of the virtual voltage signal VVR is greater than the voltage level of the low-side voltage signal VLS (corresponding to the comparison signal CMP at the disable level). Thus, the operation S410 is performed.

In the operation S410, the logic control circuit 533 subtracts "1" from the bit value of the lowest bit of the digital signal DOUT, so that the digital signal DOUT is changed to "00110110" from "00110111", in which "00110110" can be represented as "54" in decimal. It can therefore be seen that the adjustment amplitude is "00000001", which is represented as "1" in decimal, and the adjustment direction is represented by a downward decrease (−). Then, the virtual voltage signal generation circuit 371 uses this digital signal DOUT again to output the virtual voltage signal VVR for the next comparison performed by the comparison circuit 33. The operation of the virtual current signal generation circuit 153 after the time point T11 can be deduced by analogy according to the descriptions of the operations S408-S410, and thus, the related description is omitted herein.

It can be seen from the above descriptions that in the linear mode, the digital control circuit 353 adjusts the digital signal DOUT multiple times according to the comparison signal CMP, and the adjustment amplitude of the digital signal DOUT is a fixed value, that is, "1", which is not changed as the number of times of adjusting the digital signal DOUT is increased.

In FIG. 5, a trend line C1 is illustrated by connecting multiple voltage levels of the low-side voltage signal VLS at the time points T1-T8, and a trend line C2 is illustrated by connecting multiple voltage levels of the virtual voltage signal VVR at the time points T1-T8. It can be seen from the trends of the trend lines C1 and C2 that in the binary mode, the digital circuit 35 completes the setting of the bit value of each bit of the digital signal DOUT through the N comparisons (which are corresponding to N cycles of the control signal PWM, respectively) of the virtual voltage signal VVR and the low-side voltage signal VLS, so that the virtual voltage signal VVR approximates the low-side voltage signal VLS rapidly. Based on this, as shown in FIG. 6, in the linear mode, the comparison of the virtual voltage signal VVR and the low-side voltage signal VLS is only performed every time when M cycles CYC of the control signal PWM passes, so that the digital circuit 35 can trim the digital signal DOUT (i.e., only the bit value of the lowest bit of the digital signal DOUT is adjusted) according to the comparison result of the virtual voltage signal VVR and the low-side voltage signal VLS. Such approach can keep the virtual voltage signal VVR approximating the low-side voltage signal VLS in the linear mode, and does not cause the virtual voltage signal VVR to change at all times (which therefore can save power). It can be seen from this that the digital circuit 35 is configured to adjust the digital signal DOUT according to the comparison result of the low-side voltage signal VLS and the virtual voltage signal VVR in each of the binary mode or the linear mode.

In some embodiments, the clock control circuit 351 of FIG. 3 can determine whether a reload operation is performed according to the voltage level of the reload signal RL. For example, when the reload signal RL is at the enable level, the clock control circuit 351 immediately switches the binary mode signal MBIN and the linear mode signal MLIN to the enable level and the disable level, respectively, such that the virtual current signal generation circuit 153 enters and operates in the binary mode (i.e., the operations S402-S407). When the reload signal RL is at the disable level, the clock control circuit 351 does not change (or maintains) the current voltage levels of the binary mode signal MBIN and the linear mode signal MLIN, so as to maintain the virtual current signal generation circuit 153 operating in the current mode.

In the above embodiments, since M is an integer greater than or equal to 2, the comparison circuit 33 equivalently compares the low-side voltage signal VLS and the virtual voltage signal VVR at intervals according to a time of at least two cycles CYC of the control signal PWM (which can be regarded as a first time) in the linear mode. For the same reason, the comparison circuit 33 compares the low-side voltage signal VLS and the virtual voltage signal VVR at intervals according to a time of at least one cycles CYC of the control signal PWM (which can be regarded as a second time) in the binary mode.

In the above embodiments, it can also be understood that the digital control circuit 353 is configured to be triggered by the clock signal CLK at the enable level to sample and hold the comparison result of the low-side voltage signal VLS and the virtual voltage signal VVR and further configured to be triggered by the latch signal LATCH at the enable level to set the bit value of one of the bits of the digital signal DOUT according to the comparison result of the low-side voltage signal VLS and the virtual voltage signal VVR.

In the above embodiments, as shown in FIGS. 5 and 6, each cycle CYC of the control signal PWM comprises an enable period PON and a disable period POFF. Accordingly, in some embodiments, as shown in FIG. 5, when the binary mode signal MBIN and the linear mode signal MLIN are at the enable level and the disable level respectively, the clock signal CLK and the latch signal LATCH are sequentially switched to the enable level during each disable period POFF of the control signal PWM.

In addition, in some embodiments, as shown in FIG. 6, when the binary mode signal MBIN and the linear mode signal MLIN are at the disable level and the enable level respectively, the clock signal CLK and the latch signal LATCH are sequentially switched to the enable level every at least two cycles CYC of the control signal PWM after the clock signal and the latch signal are switched to the enable level for the first time.

Figure 7:
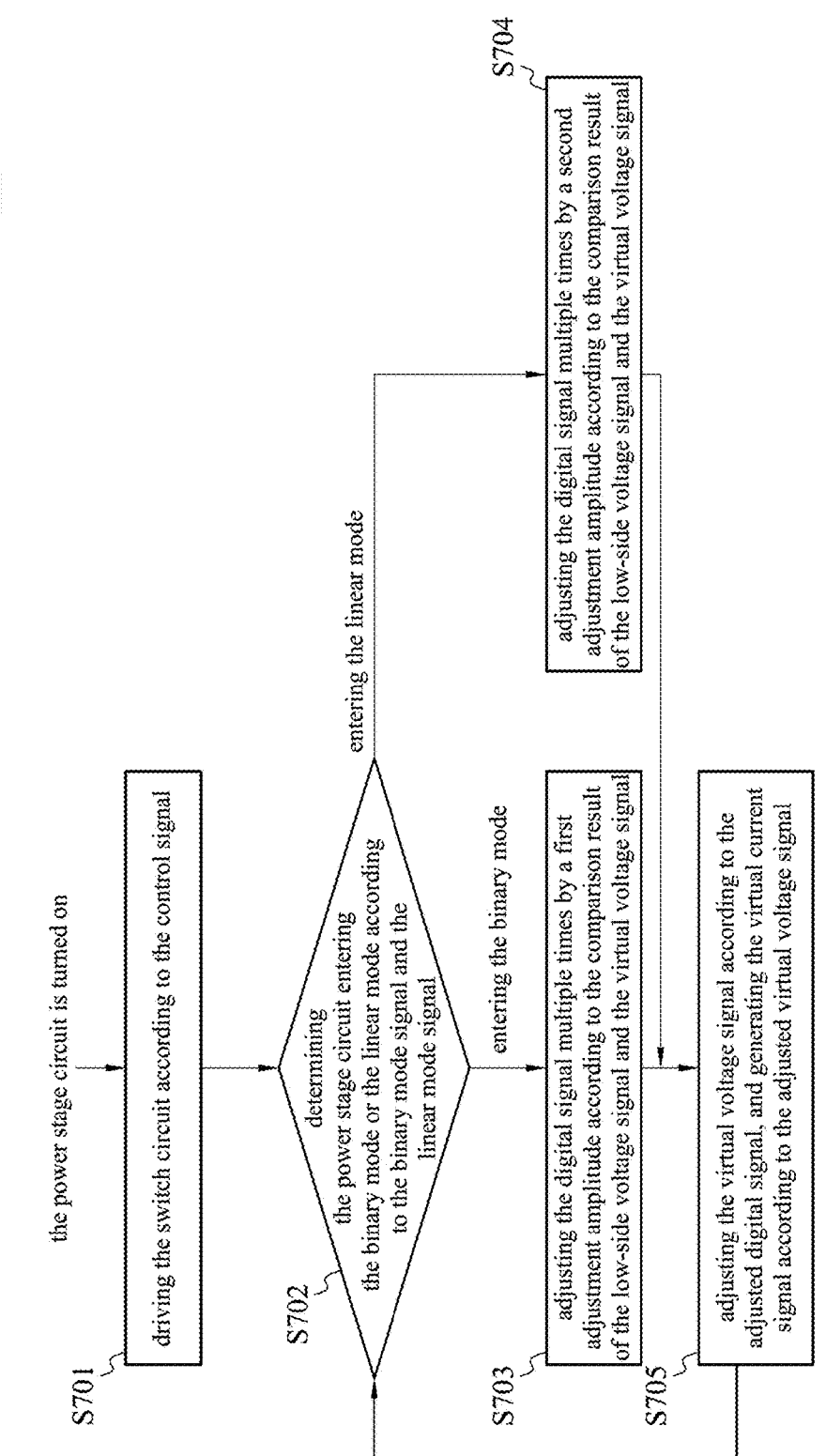
FIG. 7 is a flow diagram of a virtual current signal generation method in accordance with some embodiments of the present disclosure.

It can be seen from the descriptions of the embodiments of FIGS. 4-6 that the present disclosure also provides a generation method for the virtual current signal IVR. Referring to FIG. 7, FIG. 7 is a flow diagram of a virtual current signal generation method 700 in accordance with some embodiments of the present disclosure. In some embodiments, as shown in FIG. 7, the virtual current signal generation method 700 comprises operations S701-S705. It should be understood that the number of operations and/or the order of the operations of the virtual current signal generation method 700 can be increased, decreased and/or adjusted according to the descriptions of the above embodiments of FIGS. 1-6.

In some embodiments, as shown in FIG. 7, the operation S701 is performed after the power stage circuit 10 is turned on. In the operation S701, the driving circuit 13 drives the switch circuit 11 according to the control signal PWM. The description of the operation S701 is similar to the description of the embodiments of FIG. 1, and thus, the related description is omitted herein.

In the operation S702, the virtual current signal generation circuit 153 determines the power stage circuit 10 entering the binary mode or the linear mode according to the binary mode signal MBIN and the linear mode signal MLIN. The description of the operation S702 is similar to the description of the operation S401 in FIG. 4, and thus, the related description is omitted herein.

In some embodiments, the power stage circuit 10 enters the binary mode, so that the operation S703 is executed. In the operation S703, the digital circuit 35 in the virtual current signal generation circuit 153 adjusts the digital signal DOUT multiple times by a first adjustment amplitude according to the comparison result of the low-side voltage signal VLS and the virtual voltage signal VVR. The description of the operation S703 is similar to the description of the embodiments of FIG. 5, and thus, the related description is omitted herein. In some embodiments, the first adjustment amplitude is changeable (i.e., is a non-fixed value). In detail, as the number of times of adjusting the digital signal DOUT is increased, the first adjustment amplitude is gradually changed, for example, the first adjustment amplitude is gradually decreased.

In some embodiments, the power stage circuit 10 enters the linear mode, so that the operation S704 is performed. In operation S704, the digital circuit 35 in the virtual current signal generation circuit 153 adjusts the digital signal DOUT multiple times by a second adjustment amplitude according to the comparison result of the low-side voltage signal VLS and the virtual voltage signal VVR. The description of the operation S704 is similar to the description of the embodiments of FIG. 6, and thus, the related description is omitted herein. In some embodiments, the second adjustment amplitude is a fixed value.

In operation S705, the signal conversion circuit 37 in the virtual current signal generation circuit 153 adjusts the virtual voltage signal VVR according to the adjusted digital signal DOUT, and generates the virtual current signal IVR according to the adjusted virtual voltage signal VVR. By adjusting the digital signal DOUT, the virtual voltage signal VVR is adjusted to gradually approximate the low-side voltage signal VLS. In such way, the virtual current signal IVR can be corrected to gradually approximate the output current signal IL based on the adjustment of the virtual voltage signal VVR. The description of the operation S704 is similar to the description of the embodiments of FIGS. 5 and 6, and thus, the related description is omitted herein.

After the operation S705, the virtual current signal generation method 700 returns to the operation S702 to continue adjusting the digital signal DOUT in the binary mode or the linear mode.

In accordance with the virtual current signal generation method 700, by adjusting the digital signal DOUT and the virtual voltage signal VVR in the binary mode and/or the linear mode, the virtual current signal IVR can be further corrected. Thus, the virtual current signal IVR substantially approximates the output current signal IL, or is substantially the same as the output current signal IL.

As can be seen from the above embodiments of the present disclosure, through generating the virtual current signal IVR in proportion to the output current signal IL by the virtual current signal generation circuit 153, the power stage circuit 10 of the present disclosure can complete the current sensing during the turned-on period LON of the low-side switch Q2, and combine the virtual current signal IVR and the low-side current signal ILS which is obtained through the current sensing to generate the current monitoring signal IMON. Notably, the current monitoring signal IMON generated by this approach is applicable to the applications for low duty ratio.

In addition, in comparison to some related arts, the current monitoring circuit 15 of the present disclosure saves the number of components significantly, and corrects the virtual current signal IVR by adjusting the virtual voltage signal VVR in a digital way, thereby ensuring the stability of the virtual current signal IVR. Thus, the power stage circuit 10 and its current monitoring circuit 15 of the present disclosure have advantages of low cost, being applicable to the applications for low duty ratio, generating the current monitoring signal of high stability and high accuracy, etc.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A power stage circuit, comprising:
    a switch circuit, coupled to an output terminal of the power stage circuit, configured to receive an input voltage signal, and comprising a high-side switch and a low-side switch, wherein the output terminal is coupled to a load terminal through an inductance element;

a driving circuit, coupled to the switch circuit, and configured to drive the switch circuit according to a control signal, to generate an output voltage signal at the load terminal and generate an output current signal through the inductance element; and a current monitoring circuit, comprising:
    a current sensing circuit, coupled to the switch circuit, and configured to sense the output current signal during each turned-on period of the low-side switch, to generate a low-side current signal;
    a virtual current signal generation circuit, coupled to the current sensing circuit, configured to generate a low-side voltage signal according to the low-side current signal, configured to generate a digital signal, configured to adjust the digital signal according to a comparison result of the low-side voltage signal and a virtual voltage signal, configured to adjust the virtual voltage signal according to the digital signal so that the virtual voltage signal approximates the low-side voltage signal, and configured to generate a virtual current signal according to the virtual voltage signal; and
    a signal combination circuit, coupled to the current sensing circuit and the virtual current signal generation circuit, and configured to generate a current monitoring signal according to the low-side current signal and the virtual current signal,
    wherein in a linear mode, the virtual current signal generation circuit is configured to compare the low-side voltage signal and the virtual voltage signal at intervals according to a first time, and
    wherein in the linear mode, the virtual current signal generation circuit is configured to adjust the digital signal multiple times by a first adjustment amplitude according to the comparison result of the low-side voltage signal and the virtual voltage signal, and the first adjustment amplitude is a fixed value.

2. The power stage circuit of claim 1, wherein the virtual current signal generation circuit is configured to adjust a bit value of a lowest bit of the digital signal by the first adjustment amplitude according to the comparison result of the low-side voltage signal and the virtual voltage signal, and a variation of the bit value of the lowest bit of the digital signal is corresponding to the first adjustment amplitude.

3. The power stage circuit of claim 2, wherein when a voltage level of the virtual voltage signal is smaller than a voltage level of the low-side voltage signal, the virtual current signal generation circuit is configured to add the first adjustment amplitude to the bit value of the lowest bit, and
    wherein when the voltage level of the virtual voltage signal is greater than the voltage level of the low-side voltage signal, the virtual current signal generation circuit is configured to subtract the first adjustment amplitude from the bit value of the lowest bit.

4. The power stage circuit of claim 1, wherein in a binary mode, the virtual current signal generation circuit is configured to compare the low-side voltage signal and the virtual voltage signal at intervals according to a second time, and
    wherein in the binary mode, the virtual current signal generation circuit is configured to adjust the digital signal multiple times by a second adjustment amplitude according to the comparison result of the low-side voltage signal and the virtual voltage signal, and the second adjustment amplitude is gradually changed as a number of times of adjusting the digital signal is increased.

5. The power stage circuit of claim 4, wherein the first time is longer than the second time.

6. The power stage circuit of claim 4, wherein the second time is at least one cycle of the control signal.

7. The power stage circuit of claim 4, wherein in the binary mode, the virtual current signal generation circuit is configured to perform N comparisons of the low-side voltage signal and the virtual voltage signal, wherein the digital signal comprises N bits, and wherein before one of the N comparisons, the virtual current signal generation circuit is configured to switch a corresponding one of the N bits of the digital signal from a first value to a second value, to generate the virtual voltage signal for the one of the N comparisons, and is configured to determine a bit value of the corresponding one of the N bits according to a result of the one of the N comparisons.

8. The power stage circuit of claim 7, wherein when a voltage level of the virtual voltage signal is smaller than a voltage level of the low-side voltage signal, the virtual current signal generation circuit is configured to determine that the bit value of the corresponding one of the N bits is set to the second value, and wherein when the voltage level of the virtual voltage signal is greater than the voltage level of the low-side voltage signal, the virtual current signal generation circuit is configured to determine that the bit value of the corresponding one of the N bits is set to the first value.

9. The power stage circuit of claim 1, wherein the first time is at least two cycles of the control signal.

10. A power stage circuit, comprising:

a switch circuit, coupled to an output terminal of the power stage circuit, configured to receive an input voltage signal, and comprising a high-side switch and a low-side switch, wherein the output terminal is coupled to a load terminal through an inductance element;

a driving circuit, coupled to the switch circuit, and configured to drive the switch circuit according to a control signal, to generate an output voltage signal at the load terminal and generate an output current signal through the inductance element; and a current monitoring circuit, comprising:

a current sensing circuit, coupled to the switch circuit, and configured to sense the output current signal during each turned-on period of the low-side switch, to generate a low-side current signal;

a virtual current signal generation circuit, coupled to the current sensing circuit, configured to generate a low-side voltage signal according to the low-side current signal, configured to generate a digital signal, configured to adjust the digital signal according to a comparison result of the low-side voltage signal and a virtual voltage signal in a first mode or a second mode, configured to adjust the virtual voltage signal according to the digital signal so that the virtual voltage signal approximates the low-side voltage signal, and configured to generate a virtual current signal according to the virtual voltage signal; and a signal combination circuit, coupled to the current sensing circuit and the virtual current signal generation circuit, and configured to generate a current monitoring signal according to the low-side current signal and the virtual current signal, wherein in the first mode, the virtual current signal generation circuit is configured to adjust the digital signal multiple times by a first adjustment amplitude, and the first adjustment amplitude is gradually changed as a number of times of adjusting the digital signal is increased, and wherein in the second mode, the virtual current signal generation circuit is configured to adjust the digital signal multiple times by a second adjustment amplitude, and the second adjustment amplitude is a fixed value.

11. The power stage circuit of claim 10, wherein the virtual current signal generation circuit comprises:

a current-to-voltage conversion circuit, coupled to the current sensing circuit, and configured to convert the low-side current signal to the low-side voltage signal;

a comparison circuit, coupled to the current-to-voltage conversion circuit, and configured to compare the low-side voltage signal and the virtual voltage signal;

a digital circuit, coupled to the comparison circuit, configured to generate the digital signal, and configured to adjust the digital signal according to the comparison result of the low-side voltage signal and the virtual voltage signal in the first mode or the second mode; and a signal conversion circuit, coupled to the digital circuit and the comparison circuit, configured to receive the digital signal, the input voltage signal and the output voltage signal, and configured to generate the virtual voltage signal according to the digital signal, the input voltage signal and the output voltage signal, to generate the virtual current signal.

12. The power stage circuit of claim 11, wherein in the first mode, the comparison circuit is configured to perform N comparisons of the low-side voltage signal and the virtual voltage signal, wherein the digital signal comprises N bits, and wherein before one of the N comparisons, the comparison circuit is configured to switch a corresponding one of the N bits of the digital signal from a first value to a second value so that the signal conversion circuit generates the virtual voltage signal for the one of the N comparisons, and is configured to determine a bit value of the corresponding one of the N bits according to a result of the one of the N comparisons.

13. The power stage circuit of claim 12, wherein when a voltage level of the virtual voltage signal is smaller than a voltage level of the low-side voltage signal, the digital circuit is configured to determine that the bit value of the corresponding one of the N bits is set to the second value, to adjust the digital signal, and wherein when the voltage level of the virtual voltage signal is greater than the voltage level of the low-side voltage signal, the digital circuit is configured to determine that the bit value of the corresponding one of the N bits is set to the first value.

14. The power stage circuit of claim 12, wherein before the N comparisons, the digital circuit is configured to set a bit value of each of the N bits of the digital signal to be the first value.

15. The power stage circuit of claim 11, wherein in the second mode, the comparison circuit is configured to compare the low-side voltage signal and the virtual voltage signal at intervals according to at least two cycles of the control signal, and wherein the digital circuit is configured to adjust a bit value of a lowest bit of the digital signal according to the comparison result of the low-side voltage signal and the virtual voltage signal, and a variation of the bit value of the lowest bit of the digital signal is corresponding to the second adjustment amplitude.

16. The power stage circuit of claim 15, wherein when a voltage level of the virtual voltage signal is smaller than a voltage level of the low-side voltage signal, the digital circuit is configured to add the second adjustment amplitude to the bit value of the lowest bit, and wherein when the voltage level of the virtual voltage signal is greater than the voltage level of the low-side voltage signal, the digital circuit is configured to subtract the second adjustment amplitude from the bit value of the lowest bit.

17. The power stage circuit of claim 11, wherein the digital circuit comprises:

a clock control circuit, configured to receive the control signal, a power-on reset voltage signal and a reload signal, and configured to generate a clock signal, a latch signal, a first mode signal and a second mode signal according to the control signal, the power-on reset voltage signal and the reload signal; and a digital control circuit, coupled to the clock control circuit, configured to be triggered by the clock signal at an enable level to sample and hold the comparison result of the low-side voltage signal and the virtual voltage signal, and configured to be triggered by the latch signal at the enable level to set a bit value of one of a plurality of bits of the digital signal according to the comparison result of the low-side voltage signal and the virtual voltage signal, wherein when the first mode signal and the second mode signal are at the enable level and a disable level, respectively, the clock signal and the latch signal are sequentially switched to the enable level during each disable period of the control signal, and wherein when the first mode signal and the second mode signal are at the disable level and the enable level, respectively, the clock signal and the latch signal are sequentially switched to the enable level every at least two cycles of the control signal after the clock signal and the latch signal are initially switched to the enable level.

18. The power stage circuit of claim 11, wherein the signal conversion circuit comprises:

a virtual voltage signal generation circuit, configured to convert a calculation result of the input voltage signal minus the output voltage signal to a first current signal according to the digital signal during each turned-on period of the high-side switch, and configured to convert a negative number of the output voltage signal to a second current signal according to the digital signal during each turned-on period of the low-side switch, to generate the virtual voltage signal; and a voltage-to-current conversion circuit, coupled to the virtual voltage signal generation circuit, and configured to convert the virtual voltage signal to the virtual current signal.

19. The power stage circuit of claim 10, wherein the signal combination circuit is configured to combine:

the virtual current signal to which each turned-on period of the high-side switch and a first period in each turned-on period of the low-side switch are corresponding; and the low-side current signal to which a second period in each turned-on period of the low-side switch is corresponding, to generate the current monitoring signal.

20. A virtual current signal generation method, applicable to a power stage circuit, wherein the power stage circuit comprises a switch circuit and a driving circuit, and the virtual current signal generation method comprises:

driving the switch circuit according to a control signal when the power stage circuit is turned on;

determining the power stage circuit entering a binary mode or a linear mode according to a binary mode signal and a linear mode signal;

adjusting a digital signal multiple times by a first adjustment amplitude according to a comparison result of a low-side voltage signal and a virtual voltage signal when the power stage circuit enters the binary mode, wherein the first adjustment amplitude is gradually changed as a number of times of adjusting the digital signal is increased;

adjusting the digital signal multiple times by a second adjustment amplitude according to the comparison result of the low-side voltage signal and the virtual voltage signal when the power stage circuit enters the linear mode, wherein the second adjustment amplitude is a fixed value;

adjusting the virtual voltage signal according to the adjusted digital signal so that the virtual voltage signal approximates the low-side voltage signal; and generating a virtual current signal according to the virtual voltage signal.

* * * * *